United States Patent [19]
Gupta et al.

[11] Patent Number: 5,822,743
[45] Date of Patent: Oct. 13, 1998

[54] KNOWLEDGE-BASED INFORMATION RETRIEVAL SYSTEM

[75] Inventors: Kalyan Moy Gupta, Hamilton; Alan Mark Langley, Mississauga; John Yen Ching, Oakville, all of Canada

[73] Assignee: 1215627 Ontario Inc., Brampton, Canada

[21] Appl. No.: 835,558

[22] Filed: Apr. 8, 1997

[51] Int. Cl.[6] .................................................. G06F 15/18
[52] U.S. Cl. .............................. 706/50; 706/46; 706/61; 706/54
[58] Field of Search ................................ 706/45, 46, 49, 706/50, 47, 59, 54, 61; 395/183.02; 704/9

[56] References Cited

U.S. PATENT DOCUMENTS

| | | | |
|---|---|---|---|
| 4,658,370 | 4/1987 | Erman et al. | 706/60 |
| 4,697,243 | 9/1987 | Moore et al. | 706/59 |
| 4,763,277 | 8/1988 | Ashford et al. | 706/47 |
| 4,964,125 | 10/1990 | Kim | 395/183.02 |
| 4,985,857 | 1/1991 | Bajpai et al. | 702/184 |
| 5,107,497 | 4/1992 | Lirov et al. | 395/183.02 |
| 5,127,005 | 6/1992 | Oda et al. | 395/183.02 |
| 5,224,206 | 6/1993 | Simoudis | 706/61 |
| 5,282,265 | 1/1994 | Suda et al. | 706/11 |
| 5,317,677 | 5/1994 | Dolan et al. | 706/10 |
| 5,319,739 | 6/1994 | Yoshiura et al. | 706/54 |
| 5,402,524 | 3/1995 | Bauman et al. | 706/45 |
| 5,424,947 | 6/1995 | Nagao et al. | 706/9 |
| 5,581,664 | 12/1996 | Allen et al. | 706/46 |
| 5,586,218 | 12/1996 | Allen | 706/12 |
| 5,644,686 | 7/1997 | Hekmatpour | 706/59 |
| 5,684,999 | 11/1997 | Okamoto | 704/9 |
| 5,715,468 | 2/1998 | Budzinski | 704/9 |
| 5,717,835 | 2/1998 | Hellerstein | 706/46 |

FOREIGN PATENT DOCUMENTS

08194618 A   7/1996   Japan ................................ G06F 9/44

OTHER PUBLICATIONS

McErlean et al., "Classification of knee problems to provide evidential support," Kybernetes, vol. 26, No. 4–5, pp. 574–588, 1997.

Primary Examiner—Tariq R. Hafiz
Attorney, Agent, or Firm—Bereskin & Parr

[57] ABSTRACT

A method and system for assisting a user in solving a new problem case within a selected domain, such as a complex apparatus. The method comprises the steps of providing a case database comprising domain knowledge for the selected domain and previously solved cases, each previously solved case including a plurality of case attributes, said case attributes comprising case attribute names and associated values, prompting the user to select from the case attributes a set of new problem case attributes considered to be relevant to the new problem case and to provide current values for each of the new problem case attributes, searching the database of solved cases for candidate solved cases that have one or more of the new problem case attributes selected by the user and generating a list of said candidate solved cases, matching the candidate solved cases to the new problem case by comparing the value for each of the case attributes in the new problem case to the value for the same case attribute in each of the candidate solved cases, ranking the candidate solved cases in descending order of similarity and presenting a list of candidate solved cases in order of relevance based upon the ranking, generating additional questions based upon unanswered attributes of the candidate solved cases for which values have not yet been provided by the user, to assist the user to select and provide values for the unanswered attributes and thereby appropriately order the candidate solved cases; and repeating the above steps until the user is satisfied with the list of candidate solved cases.

30 Claims, 12 Drawing Sheets

KNOWLEDGE-BASED INFORMATION RETRIEVAL SYSTEM

FIELD OF THE INVENTION

The present invention relates to knowledge-based decision support system for solving problems, and more particularly, to systems using case-based reasoning, that search for and present stored solution cases that most closely relate to a new problem.

BACKGROUND OF THE INVENTION

Competitive markets have forced the organizations of today to continuously innovate and to produce increasingly sophisticated products and services. The manufacture and service of these sophisticated products is done by specialists with a high level of education, and those who have acquired skills and knowledge through substantial field experience. Reliable and high quality service is nearly impossible without these highly trained and experienced individuals. Furthermore, the complexity of these products often transcends any one individual's area of specialization. This presents an ideal opportunity for the use of knowledge-based technology to train individuals with appropriate education and to support them thereafter. Knowledge-based technology is particularly attractive because of its ability to collect, organize, and allow access to knowledge critical to an organization. In addition, it removes the risk of knowledge loss that may result from the potential loss of a specialist.

The traditional form of knowledge-based technology is paper documents that contain a variety of knowledge such as facts, rules, procedures, designs, and troubleshooting and problem-solving methods. However, the contents of the paper documents cannot be manipulated, are difficult to maintain, and often only accessible to a limited number of specialists. With the advent of computer-based technology, the rules and procedures are encoded and manipulated by computer programs. This form of knowledge-based technology that offers decision support using rules is called a rule-based expert system.

The expert system applications in early 1980s were developed in narrow and well-defined areas such as the diagnosis of bacterial infections in blood and identification of chemical structures. These early expert systems enjoyed a fair degree of success. However, the rule-based expert system applications in complex areas failed due to the following four reasons:

1. In complex, dynamic, and evolving decision environments, such as those encountered as a result of rapidly evolving complex technology, the ability to easily add rules is critical. Addition of rules affect the decisions offered by the system in unpredictable ways. Furthermore, as the number of rules in the system grow, the system becomes extremely sluggish and its reasoning unreliable.

2. In complex areas, specialists find it difficult articulate their knowledge in the form of rules. Consequently, the expert system cannot be built.

3. The typical expert system reasoning is stymied if the specialist is unable to provide the information needed by the system. This breakdown of reasoning is termed as the brittleness of expert systems.

4. The interaction of a specialist with the expert system typically requires him/her to answer the questions in the order posed by the system. That is, the reasoning is entirely driven by the system. This is very restrictive because the specialists frequently disagree with the systems line of questioning.

To overcome these shortcomings, a number of new knowledge-based paradigms were developed. These include neural networks, fuzzy logic, and case-based reasoning (CBR) systems. Of these, CBR technology has adequately addressed the above mentioned issues and is particularly suited to complex and dynamic decision environments. Case-based reasoning systems make use of experience (i.e., previously solved cases) to solve similar new problems. The fundamental processes of CBR include the following:

1. Describe the new problem case to be solved;
2. Retrieve previously solved cases;
3. Adapt the previously solved cases to the new problem case;
4. Stop if the new problem case has been solved or;
5. Learn or acquire more knowledge about the new problem case.

Many variations of these fundamental processes can be found in the scientific literature and applications (*Case-Based Reasoning*. Kolodner, Janet L., 1993). For example, CBR applications to problems such as diagnosis of complex machinery require incremental reasoning and problem elaboration. The nature of these problems requires that the description be revised to include new facts and evidences till the problem is resolved. The premise is that the problem definition is closely linked to the problem solution process. In contrast, many CBR applications do not require elaboration. For example, a CBR system for robot control and a CBR system for diagnosis of heart diseases. In such applications, all the needed facts or observations are available at the outset hence the problem description is complete.

One can find significant variations among CBR systems in their implementations of the fundamental CBR processes. Most of the currently available CBR applications have been developed to solve relatively simple problems in narrow and well-defined areas. This limits the variety and complexity that the CBR system has to deal with. This is still beneficial because the CBR system inherently eliminates the deficiencies of rule-base systems. However, the methodologies required to provide acceptable decision support when dealing with complex problem areas need to be much more sophisticated. In other words, significant implementation differences arise depending on the intended area of application. Likewise, the methodologies discussed herein have been particularly designed to provide a CBR system with the ability to improve decision support for complex problems.

SUMMARY OF THE INVENTION

The present invention is directed to a method for assisting a user in solving a new problem case within a selected domain. The method comprises the steps of providing a database comprising global domain knowledge relating to components of the selected domain, local domain knowledge, and a plurality of previously solved cases in the selected domain, each of the previously solved cases including a plurality of case attributes, said case attributes comprising case attribute names and known values associated therewith, said local domain knowledge comprising associations between the case attributes of a previously solved case; prompting the user to select a component of the domain and to select from the case attributes a set of attributes considered to be relevant to the new problem case and to provide current values for each of the new problem case attributes; searching the database of previously solved cases for candidate solved cases that include one or more of the new problem case attributes selected by the user and generating a list of said candidate solved cases; matching the candidate solved cases to the new problem case by comparing the current value for each of the new problem case attributes to the known value for the same case attribute in each of the candidate solved cases; ranking the candidate solved cases in order of relevance based upon their similarity and presenting a list of ranked candidate solved cases in order of relevance based upon the ranking; generating additional questions based upon unanswered attributes of the candidate solved cases for which values have not yet been provided by the user, and based upon the local domain knowledge, thereby assisting the user to select and provide values for the unanswered attributes; and repeating the above steps until the user is satisfied with the list candidate solved cases.

The local domain knowledge preferably comprises importance factors for the case attributes within a previously solved case, the importance factors being utilized in determining of which attributes questions should first be asked, precedent constraints linking case attributes within a previously solved case, the precedent constraints enabling questions related to the unanswered attributes to be generated only if the precedent constraints are satisfied, and match operators which enable values for case attributes relating to the new problem case to be matched with the known values of previously solved cases.

The invention is also directed to a computer system for assisting a user in solving a new problem case relating to a domain. The system comprises storage means for storing local domain knowledge and previously solved case records in a database. Each of said previously solved case records comprising a plurality of case attribute fields, said case attribute fields comprising case attribute names and associated values. The local domain knowledge comprises associations between the case attributes of a previously solved case. The system also comprises interface means for interfacing with the user, comprising output means for outputting to the user a list of case attributes of the previously solved case records, and input means for enabling the user to select from the list of case attributes a set of problem case attributes considered to be relevant to the problem case, and to input current values for case attributes relating to a new problem case, and processing means coupled to the storage means and the interface means for processing the current values of the problem case attributes. The processing means comprises searching means for searching the previously solved cases for solution candidate cases; matching means for matching the solution candidate cases to the new problem case by comparing the current values of the problem case attributes with stored values for the same case attributes for each of the solution candidate cases; ranking means for ranking the solution candidate cases in order of relevance based upon the similarity and creating a list of solution candidate cases based upon said ranking; and question generation means for generating additional questions based upon unanswered attributes in the solution candidate cases for which values have not yet been provided by the user, to assist the user to enter additional current values for case attributes.

The present invention is further directed to a method for assisting a user in solving a new problem case within a selected domain, comprising the steps of providing a database comprising global domain knowledge relating to components of the selected domain, local domain knowledge, and a plurality of previously solved cases in the selected domain, each of the previously solved cases including a plurality of case attributes, said case attributes comprising case attribute names and known values associated therewith, said local domain knowledge comprising associations between the case attributes of a previously solved case, prompting the user to select a component of the domain and to select from the case attributes a set of attributes considered to be relevant to the new problem case and to provide current values for each of the new problem case attributes, searching the database of previously solved cases for candidate solved cases that include one or more of the new problem case attributes selected by the user and generating a list of said candidate solved cases, and matching the candidate solved cases to the new problem case by comparing the current value for each of the new problem case attributes to the known value for the same case attribute in each of the candidate solved cases.

BRIEF DESCRIPTION OF THE DRAWINGS

The present invention will now be described, by way of example only, with reference to the following drawings, in which like reference numerals refer to like parts, and in which.

DETAILED DESCRIPTION OF THE PREFERRED EMBODIMENT

Figure 1:
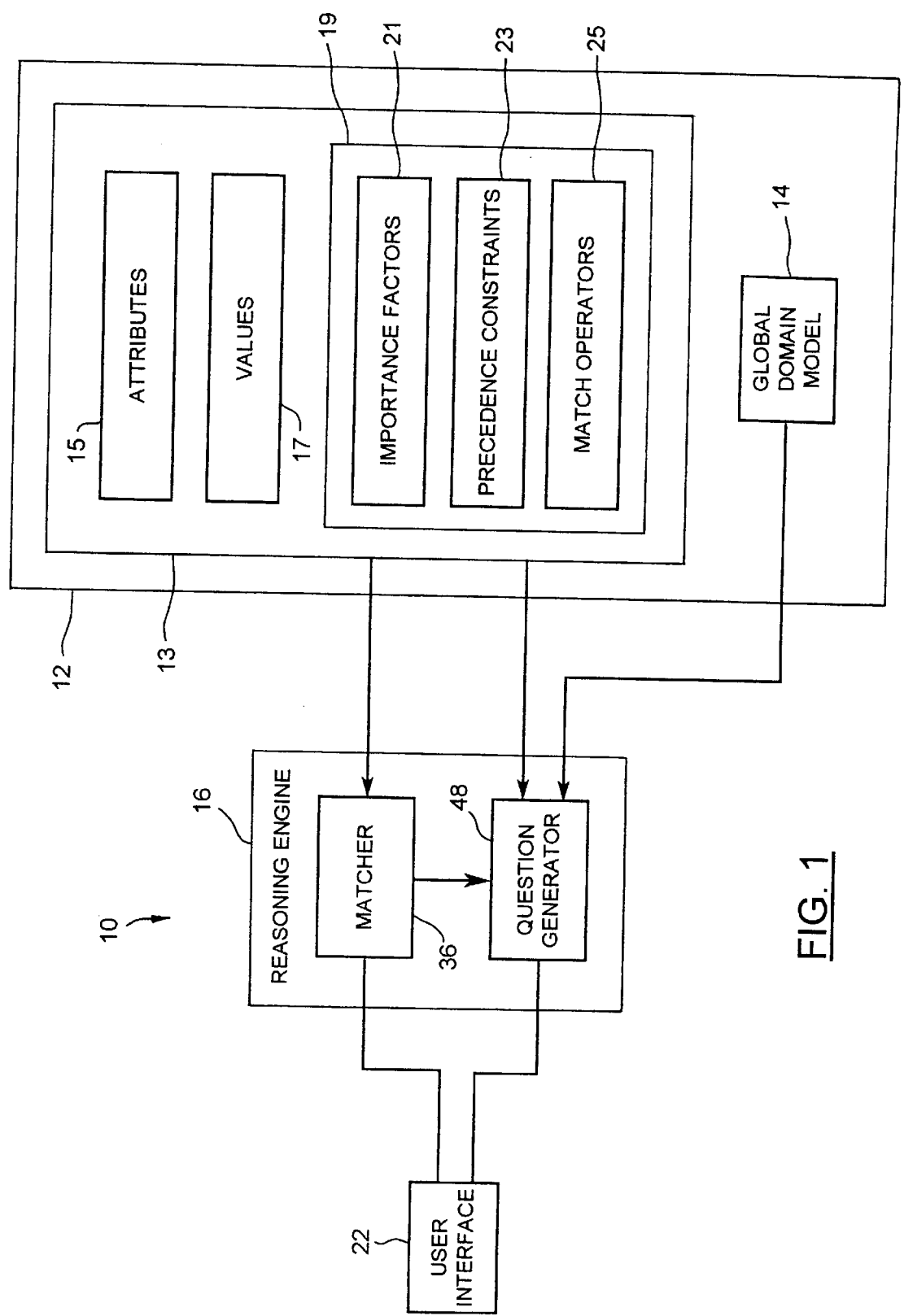
FIG. 1 is a schematic diagram of a system made in accordance with a preferred embodiment of the subject invention.

Referring to FIG. 1, illustrated therein is a case-based reasoning system shown generally as 10, made in accordance with a preferred embodiment of the subject invention. System 10 assists users in solving a new problem by retrieving case information on known problems and their solutions, within a particular domain, such as a complex apparatus, and comparing information about the new problem with the solved case information. Case-based reasoning system 10 comprises a database 12 comprising case database 13 and global domain model 14, a reasoning engine 16 comprising a matcher 36 and a question generator 48, and a user interface 22. Case database 13 includes for each of a plurality of previously solved cases, various case attributes 15, and attribute values 17, as well as local domain knowledge 19 in the form of attribute importance factors 21, precedence constraints 23 and match operators 25.

Case database 13 may be altered and new cases added without affecting the existing case history. Each case stores only the information relevant to that case, thus there is no record of domain knowledge in the case beyond the components relevant to the case. For example, if a new jet engine component is added to a domain of jet aircraft, the existing cases would not have to be updated as they do not apply to the new engine type nor is it required that they store information about it. This flexibility is achieved by utilizing a third-normal form relational database for the storage of case and domain information in separate tables. The case and domain data is preferably stored in a SQL-92 compliant relational database. The database engine may be a Borland Interbase Server bundled with a Delphi 2.0 Developer, although other SQL-92 compliant database servers, such as Oracle, Sybase or MicroSoft SQL Server, can be used.

Database 12 includes system administration tables, domain tables, case tables, and problem report tables. The system adminstration tables are typically used by the case administrator to maintain meta level database control, and to control data access, grants of user rights, etc. The domain tables provide the necessary descriptive language to represent a case, and typically include equipment, component and hierarchy tables. The case tables preferably include a case header table and a case detail table. The problem report tables are used to record information about a new problem generated during a user session, and are similar to the case tables.

Typically, a user will describe a new problem by specifying an attribute and a value for the attribute. Consider for example a problem in the area of extrusion equipment maintenance. A user knows that "the die end is leaking". The goal of system 10 is to assist the user in making observations that identify the cause of the leakage. The various root causes (i.e. stored cases) could be that "seal size was improper", "seal was worn", "seal had come loose" and so on. The relevant question to identify the root cause could be "when was the seal last changed?", "is the seal rubbing the chill roll?", "have the tightening bolts sunk in?", and so on. Question generator 48 selects and orders such questions for presentation to the user. Question generator 48 receives its input from matcher 36, case database 13, and global domain model 14, and sends its output to user interface 22. Matcher 36 provides the overall similarity between a new problem case and stored cases in case database 13, case database 13 provides various pieces of local domain knowledge 19, and global domain model 14 provides the format and content of the questions.

Typically, domain knowledge can be specified at two levels of granularity:

(1.) global level; the knowledge applies to the whole case base; and (2.) local level; the knowledge applies only within the context of the case to which it is attached.

Attaching the domain knowledge at a local level allows a fine degree of control on the question generation process.

Often, a question should not be asked until other questions have been answered. Such situations are characterized by constraints, dependencies or other associations between two or more attributes. These constraints can be logical or practical. For example, it is not logical to ask about repeated motor tripping unless it is known that the new problem refers to tripping. Likewise, it may not be practical to observe gear teeth damage without dismantling the gear box. Precedence constraint 23 is a place holder (i.e. representation) for this kind of local domain knowledge 19. The representation method assumes conjunction when more than one precedent is specified. This assumption is reasonable since a typical case has 6–7 attributes and a few simple dependencies. However, collectively, over a family of cases, the number of constraints can be substantial and their use can accurately filter out many irrelevant and annoying questions.

The following example illustrates the use of precedence constraints 23 in a single case (see Table 1). If A and B need to be asked before C can be asked then C has precedents A and B. The question associated with attribute C is enabled locally only if the answer to A and the answer to B are "similar enough" (e.g., match >0.5) to their respective values in the case. To give the knowledge engineer a greater degree of control a local precedence similarity threshold is provided.

TABLE 1

Attribute dependency example

| Attribute | Value | Importance | Precedents |
|---|---|---|---|
| A | $V_a$ | $I_a$ | None |
| B | $V_b$ | $I_b$ | None |
| C | $V_c$ | $I_c$ | A,B |
| D | $V_d$ | $I_d$ | A,B |
| E | $V_e$ | $I_e$ | C |
| F | $V_f$ | $I_f$ | C |

The importance of an attribute toward the confirmation of the root-cause (hypothesis) is another form of local domain knowledge 19. The Importance factor 21 is used for ordering the questions and for the overall similarity (OSIM) computation. Each stored previously solved case under consideration (i.e., a Candidate Solved Case) has a set of key observations (i.e., most important) to confirm its root cause, and some secondary observations (i.e., of lesser importance than the key observations) that provide additional confirmatory evidence or sometimes disconfirmatory evidence toward an alternative hypothesis. For example, assume that the key observations shown in Table 1 are C and D and secondary observations are E and F. The key observations, precedent constraints 23 permitting, should be made first followed by the next set of observations and so on.

Match operators 25 are definitions of which attribute matching algorithm is to be used to compare the value of that attribute to the corresponding attribute in the new problem case. The result of the matching algorithm is a local (SIM) definition of similarity. These definitions of similarity are a kind of domain knowledge used for computing the overall similarity (OSIM) of a candidate solved case with a new problem case. The overall similarity (OSIM) of candidate solved cases strongly affects the question generation process.

Figure 2:
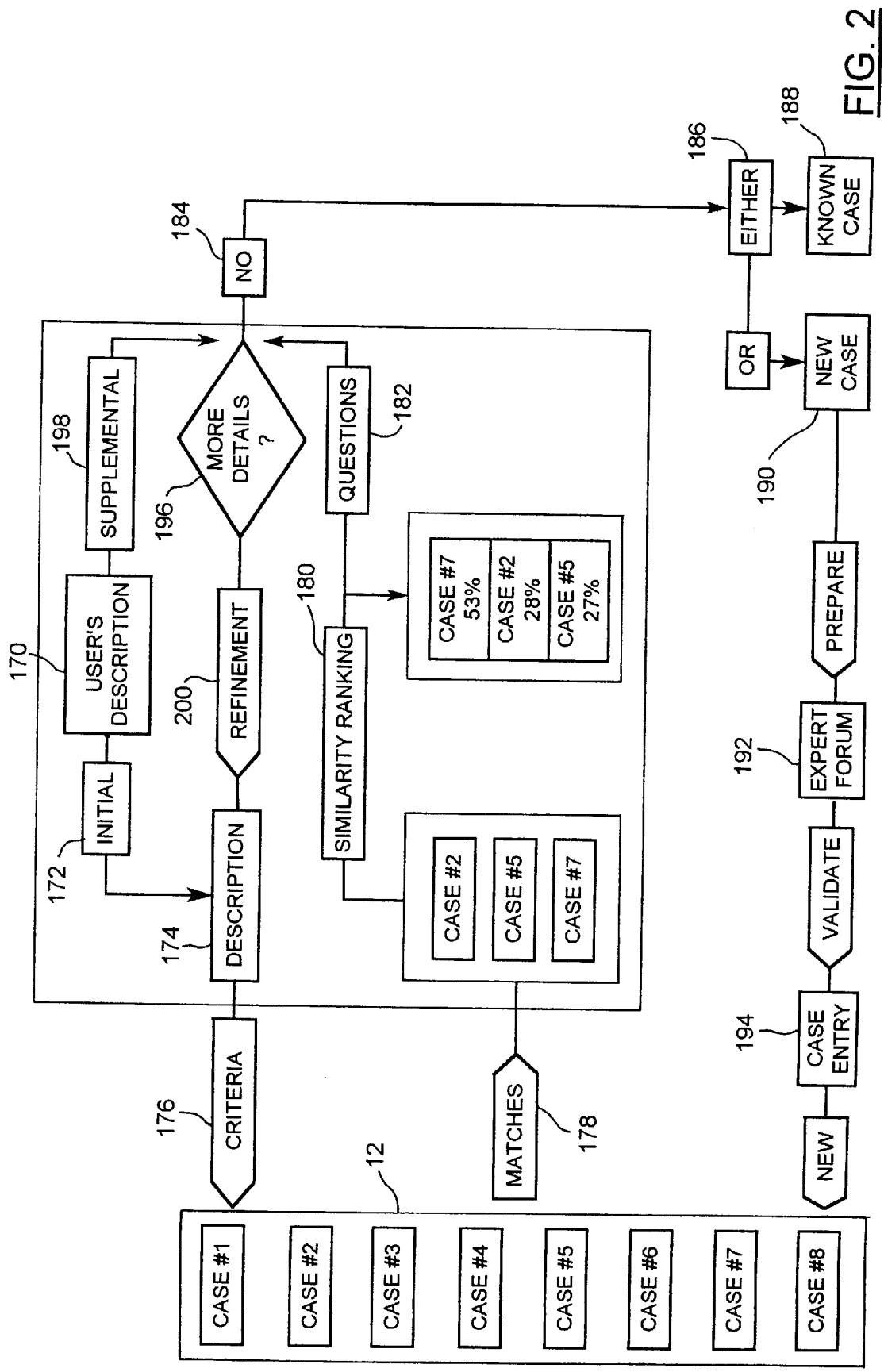
FIG. 2 is an conceptual illustration of the function of the subject invention.

FIG. 2 illustrates an overview of the problem solving process. The user enters the new problem description at step 170, this initial information 172 provides a description 174. The description 174 is used to form criteria 176 for selection of solved problem cases from the case database 13. Cases that match the selection criteria 176 are extracted at step 178 and then ranked at step 180. The ranked cases are presented to the user and additional questions asked at step 182. If the user is satisfied with the cases presented (step 196) then the new problem case is either a known solved case 188 or a new case which will be examined by an expert forum 192 and then entered into the case database 13 at step 194. If the user is not satisfied with the previously solved cases that have been retrieved, the answers to the questions asked results in refinement at step 198 resulting in a new description at step 174 and the new selection criteria 176 are established, thus repeating the entire process.

Figures 3A, 3B:
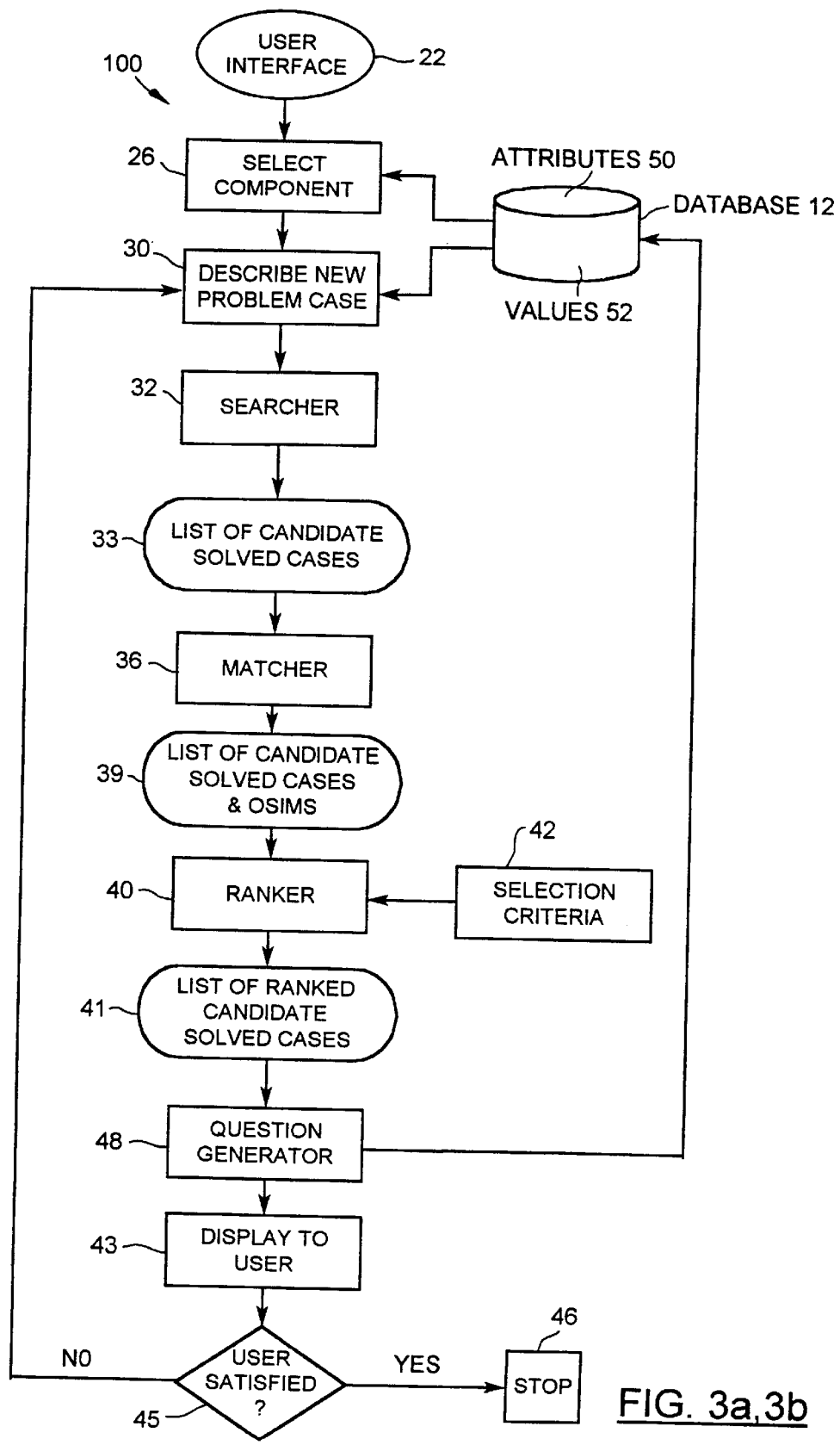
FIGS. 3a and 3b is a flow chart showing the method implemented by the reasoning engine of the subject system to retrieve and present potential solution cases and questions.

FIGS. 3a and 3b illustrates the steps of the method 100 carried out by the reasoning engine 16 of system 10 made in accordance with the subject invention. To solve a problem using system 10, a user through the user interface 22 first selects a component (block 26) from the case database 13. A domain may consist of many components. For example the domain of a jet aircraft may consist of components for a jet engine, hydraulics system and other components. In turn, the jet engine may consist of sub-components that describe particularly complex components within the engine, for example the turbine assembly.

Once a component has been selected, the user specifies as many case attributes 50 and their values 52 as are known for the new problem to define a new problem case 30. For example, if the user is dealing with the turbine assembly component discussed above, the user may provide values for the basic "attributes" of that component. These values will be the information recorded about the new problem case. Examples of attributes in the turbine assembly component may be operating temperature or blade fractures.

During the definition of the new problem case 30, the user will be informed of valid values for a selected case attribute 50. Each case attribute 50 has information on valid values 52 stored in the case database 13.

For each attribute 50 in the new problem case 30, searcher module 32 searches the case database 13 to find all previously solved cases that have the case attribute 50. The cases selected are added to a list of candidate solved cases 33. Once created, the list of candidate solved cases 33 is read by searcher module 32 and any duplicate cases are deleted.

Matcher module 36 then reads each case in the list of candidate solved cases 33, and calculates a similarity value SIM for each case attribute 50 in common with the new problem case 30. The calculation of the value of SIM is based upon the type of the case attribute 50.

Once a SIM value has been computed for each of the case attributes 50 in common with the new problem case 30 and a given candidate solved case, matcher module 36 then calculates an overall similarity OSIM. OSIM is the overall similarity between the new problem case 30 and a given candidate solved case. The list of candidate solved cases 33 is updated to add the OSIM value for each candidate solved case and the new list of candidate solved cases and OSIMs 39 created as input to ranker module 40.

Ranker module 40 reorders the list of candidate solved cases and OSIMs 39 in decreasing order of OSIM. Then based upon a selection criteria 42 such as: first five, all, or if OSIM is greater than a certain value; a list of ranked candidate solved cases 41 is created as input to the question generator module 48. Question generator module 48 reads a case from the list of ranked candidate solved cases 41, the corresponding local domain knowledge 19 and global domain knowledge 14 from the database 12, and generates questions based thereupon, in a manner hereinafter described.

As question generator module 48 reads each case from the list of ranked candidate solved cases 41, question generator 48 builds a list of unanswered attributes, i.e. case attributes which have not yet had a value provided by the user, and have had all precedence requirements met ("LA"). As each new unanswered attribute is added to the LA, the following information is stored: attribute identifier, the rank of the attribute (i.e. the higher the OSIM ranking of the case, the higher the ranking of the attribute), the attribute importance category (i.e. how important is it toward the confirmation of the root cause of the existing case) and a vote value calculated by multiplying the importance value of the attribute with its OSIM. If an attribute is found that already exists on the LA, the vote value is increased by adding to it the value of the current attribute importance multiplied by its OSIM.

Once the LA has been created, it is sorted by: OSIM rank descending, and vote descending. Questions are then posed to the user at step 43 regarding the unanswered case attributes sorted highest in the sorted LA. If the user is satisfied (block 45) with a case or cases selected by the ranker 40, the session may be terminated (block 46). If the user is not satisfied with the presented cases, the user may answer the questions displayed to the user by module 43 thereby providing more information on the new problem case. The further information provided by the user adds to the definition of the new problem case 30 and the process 100 repeats.

Figure 4:
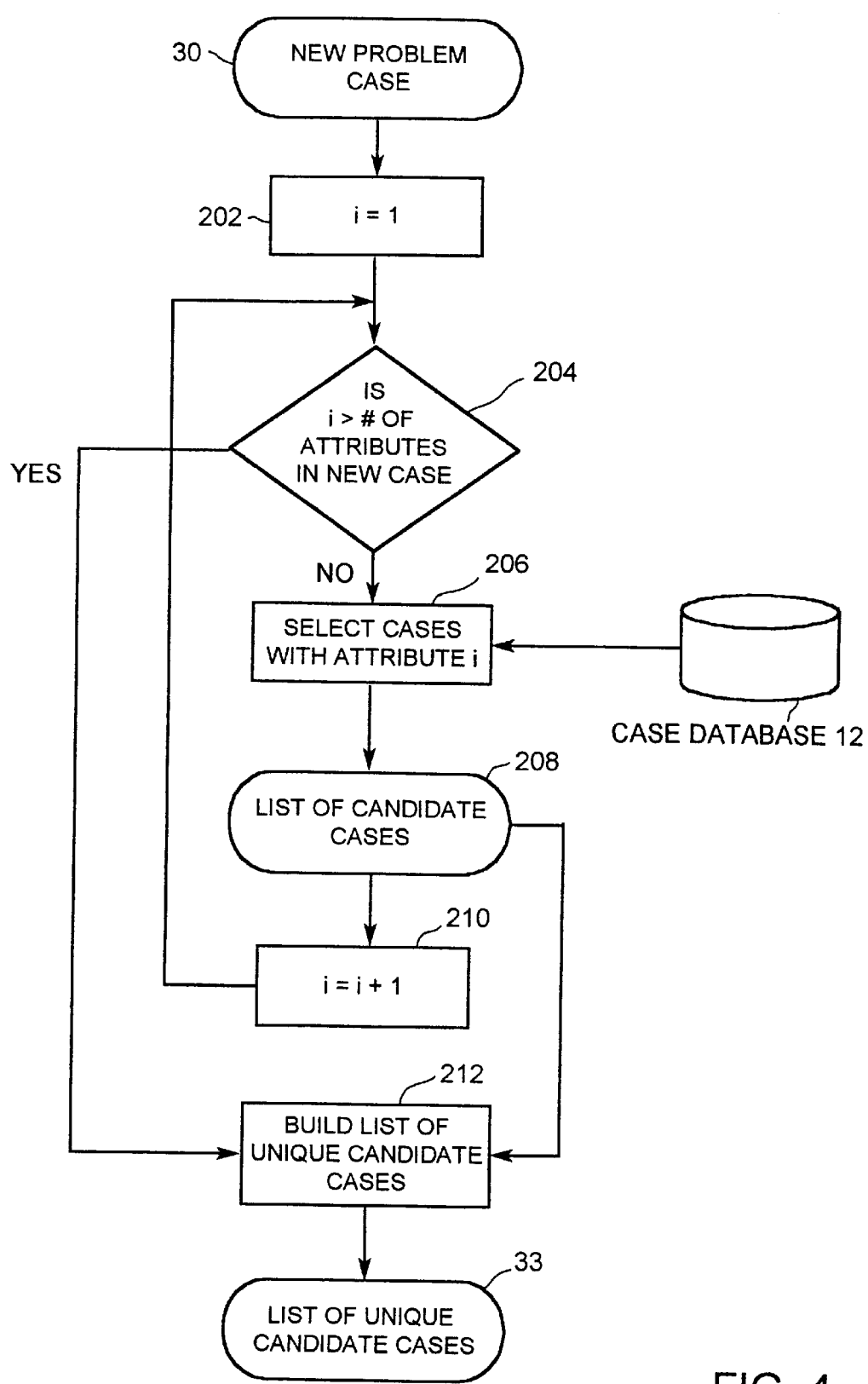
FIG. 4 is a flow chart showing the method used by the searcher of the subject system.

FIG. 4 illustrates the steps of searcher module 32. The new problem case 30 provided by the user will have a number of attributes, n. Step 202 sets a counter, i, that will indicate the current attribute being searched for. Step 204 checks to ensure the counter i is not greater than the number of attributes n in the new problem case 30. If all attributes in the new problem case 30 have been searched for, then the process jumps to step 212. If not all attributes have been searched for the process moves to step 206, extracts all previously solved cases from the case database 13, that have a value for the attribute i. These previously solved cases are added to the list of candidate solved cases 208 and the value of i incremented at step 210. Control then returns to step 204 and the process iterates until all attributes in the new problem case 30 have been examined and control passes to step 212. Step 212 reads the list of candidates solved cases 208 and discards any duplicate candidate solved cases, thereby creating a list of unique candidate solved cases 33.

Figures 5A, 5B:
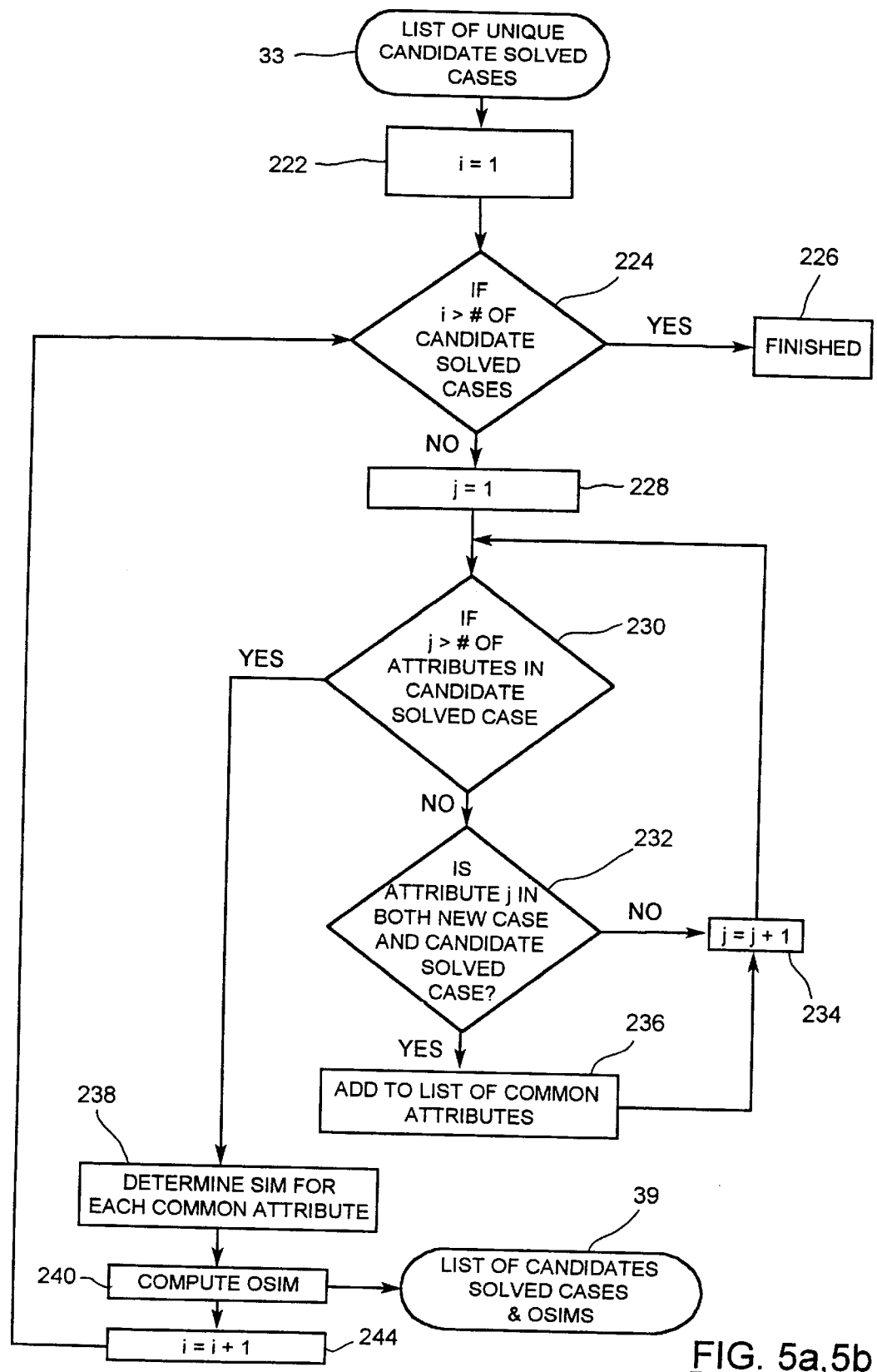
FIGS. 5a and 5b are a flow chart showing the method used by the matcher of the subject system.

FIGS. 5a and 5b illustrate the steps of matcher module 36. The matcher 36 accepts as input the list of unique candidate solved cases 33 created by the searcher 32. The list of unique candidate solved cases 33 will have a number of cases, n. Step 222 sets a counter, i, that will indicate the current candidate solved case being examined. Step 224 checks to ensure the counter i is not greater than the number of candidate solved cases in the list of unique candidate solved cases 33. If all cases in the list of unique candidate solved cases 33 have been examined then the matcher 36 has completed its function and exits via step 226. If all cases in the list of unique candidate solved cases 33 have not been examined, then the matcher 36 proceeds to step 228. The current candidate solved case (i.e. case #i) from the list of unique candidate solved cases 33 will have a number of attributes say, m. Step 228 sets a counter, j, that will indicate the current attribute being examined in the current candidate solved case. Step 230 checks to ensure the counter j is not greater than the number of attributes m in the current candidate solved case. If the current attribute j is not greater than the number of attributes m in the current candidate solved case, then step 232 is invoked. Step 232 checks to see if the current attribute j is in the new problem case 30 provided by the user. If the attribute j is in the new problem case 30, then step 236 adds the attribute j to a list of attributes common to the new problem case 30 and the current candidate solved case, then increments the value of the counter j at step 234. If the attribute j of the current candidate solved case is not in the new problem case 30, then step 236 is not invoked and value of the counter j is incremented at step 234. From step 234 the matcher 36 returns to step 230. The loop of steps 230, 232, 234 and 236 repeats until at step 230 the value of the current attribute j is greater than the number of attributes m in the current candidate solved case, then the matcher 36 moves to step 238. Step 238 determines the SIM for each attribute in the list of common attributes 236. Once each SIM has been calculated, for the attributes the current candidate solved case has in common with the new problem case 30 (i.e. the list created by step 236), then step 240 calculates the OSIM for the current candidate solved case. The OSIM and the current candidate solved case are added to the list of candidate solved cases and OSIMs 39. The value of the counter i is incremented at step 244 and the matcher 36 returns to step 224.

Figure 6:
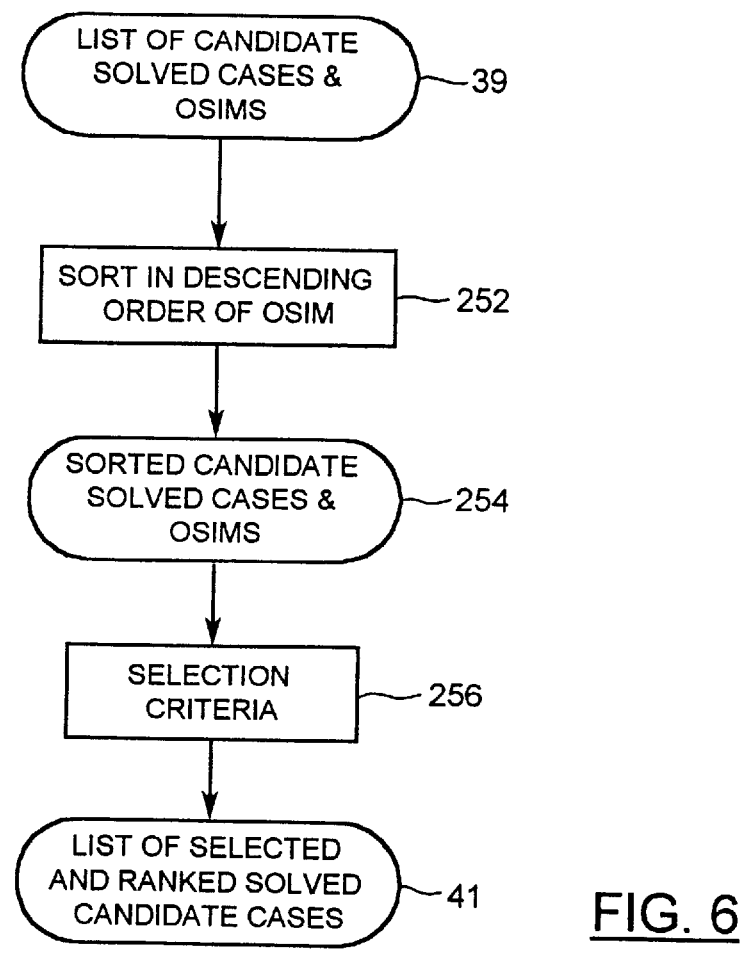
FIG. 6 is a flow chart showing the method used by the ranker of the subject system.

FIG. 6 illustrates the steps of ranker module 40. The ranker 40 accepts as input the list of candidate solved cases and OSIMs 39 created by the matcher 36. The first function performed by the matcher 40 is to sort the list of candidate solved cases and OSIMs 39 in descending order of OSIM. This function is performed at step 252, which creates a list of sorted candidate solved cases and OSIMs 254. A system defined selection criteria is then applied at 256 to determine which cases are to be displayed to the user and these cases are output in a list of selected and ranked candidate solved cases 41.

Figures 7A, 7B:
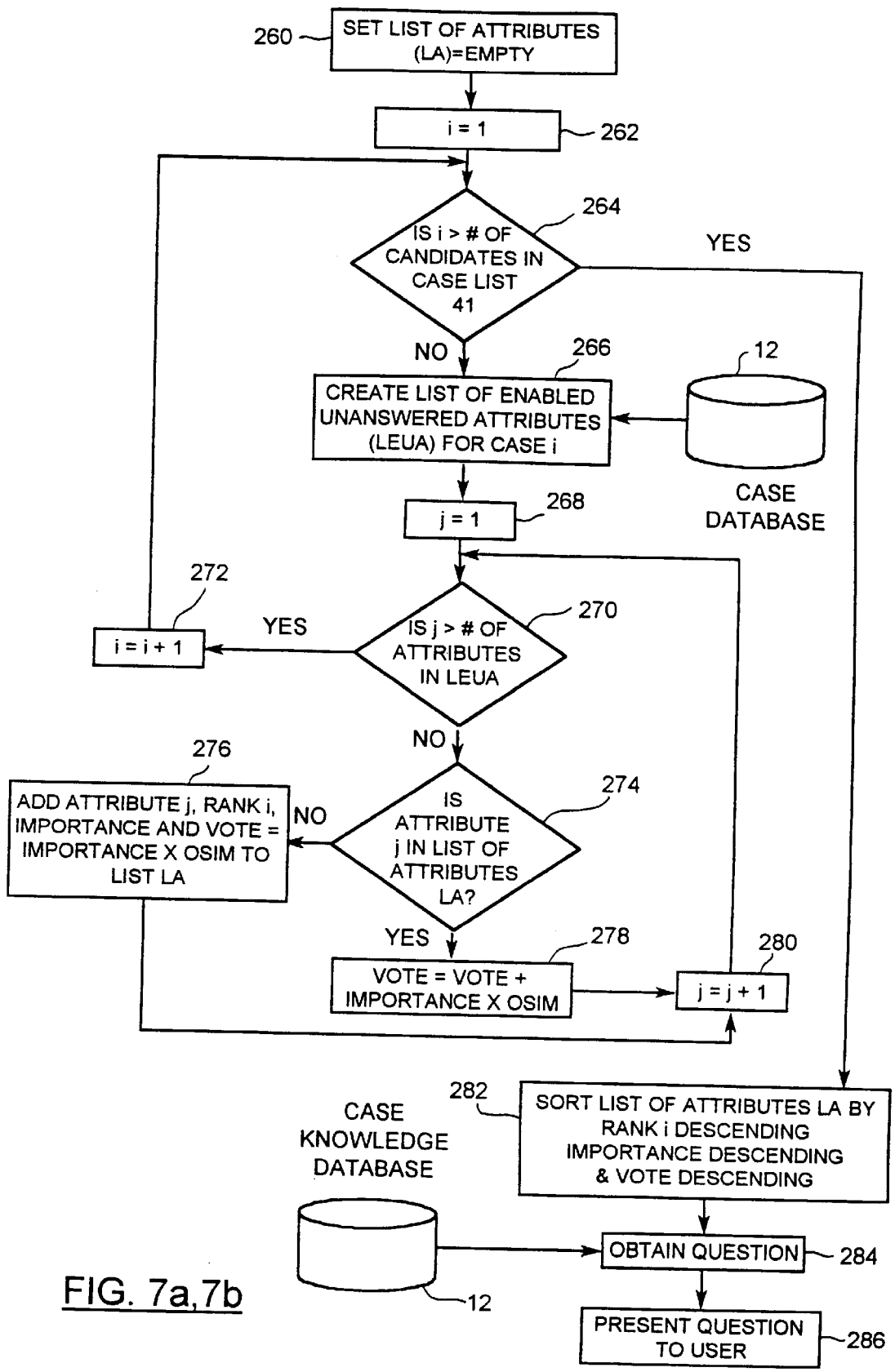
FIGS. 7a and 7b are a flow chart showing the method used by the question generator of the subject system.

FIGS. 7a and 7b illustrate the steps of question generator module 48. Step 260 initializes an empty list of attributes LA. Step 262 initializes a counter i which will indicate the number of the current candidate solved case being examined from the list of selected and ranked solved candidate cases 41. Step 264 checks to see if their are any more candidate solved cases to be examined, if there are candidate solved cases left, the process moves to step. 266. Step 266 uses the case information stored in the case database 13 to create a list of attributes in the current candidate solved case that are enabled and have had their precedents met, designated as LEUA. Step 268 then initializes a counter j that will be used to step through the attributes in the list LEUA. At step 270 if the last attribute in list LEUA has not been examined, the process moves to step 274. Step 274 checks to see if the attribute j is in the list of attributes LA. If it is not, the attribute, it's rank, importance and vote are added to list LA by step 276. If it is in the list LA, then the vote value for that attribute is incremented by adding the attribute importance multiplied by the OSIM to the current vote at step 278. Both steps 276 and 278 then proceed to step 280 where the value of j is incremented. Step 280 proceeds to step 270 and the next attribute in LEUA is checked. If at step 270 all the attributes in LEUA have been examined, step 270 proceeds to step 272 where the counter i is incremented. Step 272 then proceeds to step 264 where the number of the current candidate solved case in the list of selected and ranked solved candidate cases 41 is examined. If there are no more cases in the list of selected and ranked solved candidate cases, then step 264 proceeds to step 282. Step 282 sorts the list of attributes LA by rank descending, importance descending and vote descending and passes the sorted list LA to step 284. Step 284 checks database 12 for a question to ask for attribute at the top of the sorted list LA and poses the question to the user at step 286.

Figure 8:
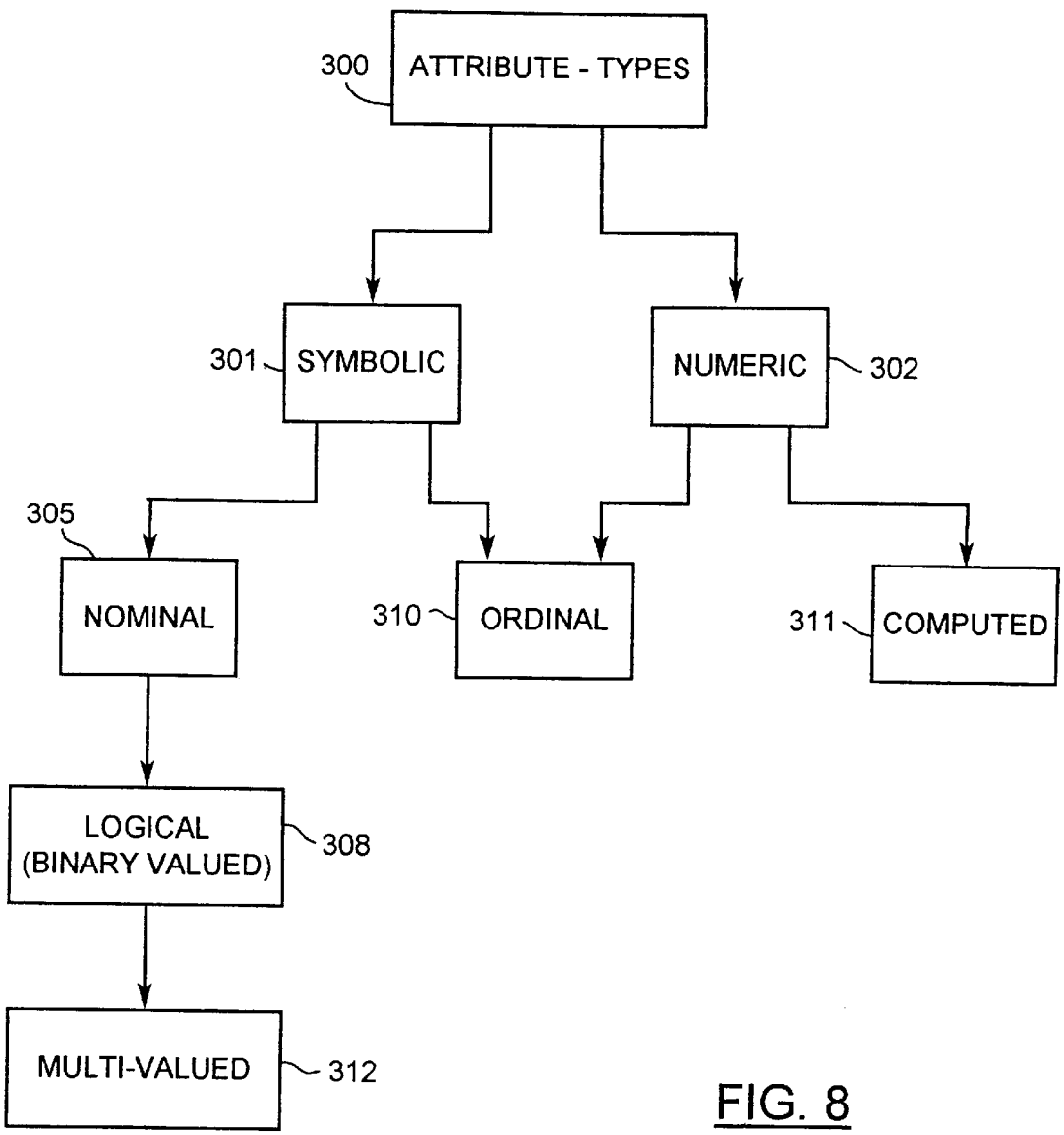
FIG. 8 is a block diagram of the attribute type hierarchy of the subject system.

FIG. 8 lists attribute types 300 based on their properties. System 10 allows for case attributes having various types of values. In the attribute categorization only symbolic 301 has distinct subtypes. It is the subtypes that are used to categorize and evaluate attributes. Thus, attributes may be categorized into eleven distinct types as shown below.
1) Symbolic-Nominal 305 (S)
2) Symbolic-Logical 308 (L)
3) Symbolic-Multi-valued 312 (M)
4) Symbolic-Ordinal 310 (O)
5) Numeric 302 (N)
6) Computed 311 (C)

Each property controls an aspect of the attribute's behaviour during run-time. Table 2 identifies the properties applicable to each attribute type.

TABLE 2

Properties Applicable to Each Attribute Type

| Properties | S | L | M | O | N | C |
|---|---|---|---|---|---|---|
| Default value | x | x | | x | x | |
| Normal value | x | x | | x | x | x |
| Multi-value logical attribute references | | | x | | | |
| Min | | | | | x | x |
| Max | | | | | x | x |
| Similarity computation Regular quad-tuple | | | | | x | x |
| Unit | | | | | x | x |
| Ordinal integer value | | | | x | | |
| Computation formula | | | | | | x |

In addition to the type-specific properties described below, one property is applicable across all attribute types. This is the Global-Similarity-Computation-Scheme. The similarity between two values of an attribute is computed by a similarity computation scheme. Various types of similarity computation schemes will be presented. The generally applicable (i.e., global) similarity computation scheme does not consider any contextual or local information. The local or contextual information resides in the cases. The global scheme is used by default. If a local scheme resides in a case it will overrule the global scheme for that particular case. The system should allow disabling of local schema. This would allow a knowledge engineer to determine the impact of local schema on the quality of output produced by the system. Only symbolic logical attributes do not require a similarity computation scheme because they are always exact matches. Lack of a similarity computation scheme implies exact matching.

The two broad categories of attribute types are symbolic and numeric. A symbolic attribute can be assigned symbol/labels as values. For example, a temperature may be "high", "medium", or "low". A numeric attribute can be assigned numbers as values, e.g.: 1.56, or 10.

A discussion of each attribute type follows.
1) Symbolic-Nominal
The symbolic nominal attribute type accepts a symbolic value. For example, the attribute CITY can be assigned a value like "Hamilton", "Toronto", "Guelph", or "St. Catherines", or an attribute ENGINE LOCATION can be assigned a value like "Left-1", "Left-2", "Right-1", or "Right-2". Symbolic nominal attributes possess the following properties:
 a) Default Value: The default value is the usual selection that a user makes for the attribute. For example, "Toronto" as a value for the attribute CITY. It is not necessarily the normal value. Specification of a default value is optional.

b) Normal Value: Since the present invention is a diagnostic system, it deals primarily with deviations from normal. The system is designed to ignore normal states. Specification of this property for nominal values is optional. Nominal values typically do not have normal value settings. When this property is unspecified, the attribute is not used for matching unless it is included in the stored case.

Similarities between any two values of a symbolic nominal attribute may be explicitly represented in a matrix. The level of similarity is specified by linguistic labels such as none, very low, low, medium, high, very high, exact. These labels can be converted to numeric values based on a linear scale, or by a non-linear scale that conforms to psychological notions of distance (See for example, adverb membership modifiers such as are used in fuzzy sets).

Linear scale (approx.): None (0), very low (0.16), low (0.33), medium (0.50), high (0.67), very high (0.83), same (1.0).

Non-linear (Sigmoid scale): For example, None (0.0), Very low (0.1) Low (0.25), Medium (0.5), high (0.75), Very high (0.9), Same (1.0). The sigmoid represents the notion that human mind tends to distinguish less at the extremes and more in the neighbourhood of average values.

2) Symbolic Logical

The symbolic logical attribute is a special case of Symbolic-Nominal (see the attribute type taxonomy in FIG. 8). A logical attribute can assume only two values. For example, True-False, On-Off, Open-Closed, In-out, Above-Below, and Present-Absent. The similarity between the two values is always zero. In other words, the matching is always exact. The symbolic logical type inherits all the properties of the symbolic nominal (i.e., default value and normal value).

3) Symbolic-multi-valued

A multi-valued attribute allows a user to assign one or more values to the attribute. This attribute type exists solely as a user convenience. For reasoning, these values are transformed into symbolic-logical-attributes with True-False or Present-Absent values. For example, the multi-valued-attribute "Fault code" can assume values F01, F02, F03 and so on. When the user selects values F01 and F03 the system performs an internal translation into attribute-values "Fault code F01"-present and "Fault code F03"-present. Properties for multi-valued attribute include:

a) Multi-value logical-attribute-references: This property specifies the list of references to symbolic logical attributes, the order in which it appears in the selection option in the user interface, and the label associated with it. For example, the attribute "Fault code" has a logical-attribute reference, comprising label "F01", its sequence number at the interface: 1, and the associated reference logical attribute ID.

A multi-valued attribute is never used in case representation. Instead, the component logical attributes are used. This attribute type does not possess properties for normal value or default value.

4) Symbolic-Ordinal

Values assigned to this attribute type are symbolic labels that have an implicit order. For example, the temperature of a component may be "Normal", "Warm", "Hot", "Very Hot", or "Extremely hot". Notice that these are subjective observations and are less precise than exact measurements such as 44.5 degrees.

The symbolic ordinal attribute type inherits its properties from the symbolic and numeric attribute types. These include the following:

a) Normal Value—as for the symbolic nominal type.
b) Default Value—as for the symbolic nominal type.
c) Similarity computation regular quad-tuple—as for the numeric type.

One additional property is required:

a) Ordinal value (Order number): This is a real number which indicates the relative ordering of the symbolic values. For example, Normal (1), Warm (2), Hot (3), Very hot (4), and extremely Hot (5). By default, the values are set at equal intervals. However, the knowledge engineer may override the defaults to increase or decrease the similarity between adjacent symbols.

During reasoning, the system uses the ordinal value. The similarity computation regular quad-tuple is based on the ordinal value property.

5) Numeric

This attribute can be assigned a real or integral number as a value. For example, the "Temperature" is "47.5" degrees. The following properties are available:

a) Default Value: This is specified when the attribute is created, and represents a subjective estimate of the most typical attribute value. This facet is required.

b) Normal Value: This indicates that the attribute may not be relevant for reasoning. Unlike its symbolic counterpart, this is a range. The range consists of an upper bound and a lower bound. For example, in the attribute "Water level" normal condition refers to any value less than 4.5 m. In this case, the lower bound is $-\infty$ and the upper bound is 4.5. This facet is required and must be specified when the attribute is created.

c) Min: The minimum valid value that the attribute can assume. For example, the attribute "Voltage" cannot be less than 0. If unspecified, the system will not impose a lower limit on values entered by the user.

d) Max: The maximum valid value that the attribute can have. For example, based on practical limits, the attribute "Voltage" cannot be more than 10,000. If unspecified, the system will not impose an upper limit on values entered by the user.

e) Similarity computation regular quad-tuple: This is a set of four parameters defined in standard attribute units. These four parameters define the attribute similarity function at a particular value. The attribute similarity function is used to compute similarity of two values. If unspecified, the matching is exact. For details, refer to the similarity computation schemes described later.

f) Unit: this is the standard dimensional unit associated with attribute values in the case base. For example, the motor current is stored in amperes. If this property is unspecified, the attribute is considered non-dimensional (i.e., None).

6) Computed

This type of attribute is computed based on two or more numeric type attributes. For example, the percentage drop in voltage is computed as (Rated-Observed)/Rated. In this example, the representation allows comparison of equipment that do not share the same voltage ratings. A numeric computed attribute inherits all numeric properties. In addition, it has the following property of Computation-formula:

This facet contains the function form that uses the numeric attribute references as its parameters. For example, computed value for percentage drop in voltage=(Rated-Observed)×100/Rated.

All attributes referenced in a computed attribute must have been defined before the computed attribute is created.

Other types of attributes can be used with the method and apparatus of the present invention, such as:
a) Time.
b) Date.
c) Symbolic Taxonomic. These are attributes organized in a "is-a-type of" hierarchy. For example, types of house.
d) User defined. This comprises any type not covered by those specified in this document that the user needs.

At its most basic level, case based reasoning consists of an attribute-by-attribute comparison of the new problem description and each solved case. For the present invention several matching schemes will be implemented. During case creation, a knowledge engineer will be able to select the matching scheme most suitable to the problem at hand.

The following sections describe the matching schemes which are implemented in the present invention.

1) default_fuzzy_match

The default_fuzzy_match algorithm corresponds to the earlier implementation's handling of symbolic matching. A lookup table defined in the domain model is used to retrieve the similarity of any two values of the attribute.

As an example, consider the following attribute definition:
attribute name: knife edge quality
attribute values: new, sharp, corroded, dull
similarity table:

|          | new | sharp | corroded | dull |
|----------|-----|-------|----------|------|
| new      | 1.0 | 0.8   | 0.3      | 0.0  |
| sharp    |     | 1.0   | 0.6      | 0.0  |
| corroded |     |       | 1.0      | 0.5  |
| dull     |     |       |          | 1.0  |

If a case contains the descriptor

| knife edge quality | default_fuzzy_match | sharp |
|--------------------|---------------------|-------|

The engine will compute the following:
similarity(new)=0.8
similarity(corroded)=0.6
similarity(dull)=0.0

The default_fuzzy_match algorithm may be used with nominal symbolic attributes.

2) custom_fuzzy_match

The custom_fuzzy_match algorithm is essentially identical to default_fuzzy_match. However, a customized lookup table stored as part of the case is used instead of the default, global lookup table. Custom_fuzzy_match is provided for special cases in which the default_fuzzy_match table is not suitable. It is not anticipated that custom_fuzzy_match will be frequently used. Because of storage and performance penalties associated with custom_fuzzy_match, default_fuzzy_match should be used whenever possible.

Custom-fuzzy_match is available for nominal symbolic attributes.

3) range

The range algorithm returns 1.0 if the attribute value falls on or within the specified limits, and 0.0 if it is outside the limits. For example, consider a case involving ice buildup on an aircraft wing. For arguments sake, assume icing only occurs between 10,000 and 15,000 feet altitude. The following representation would be used:

| altitude | range | 10000.0, 15000.0 |
|----------|-------|------------------|

The engine will compute the following:
similarity(9999.0)=0.0
similarity(10000.0)=1.0
similarity(15000.0)=1.0
similarity(15001.0)=0.0

The range algorithm may be applied to ordered, integer, and floating point attributes.

4) less_than, fuzzy_less_than

The less_than algorithm returns 1.0 if the attribute value falls on or below the specified threshold, and 0.0 if it is above the threshold. For example, consider a case involving precipitation. For arguments sake, assume precipitation only occurs below 15,000 feet altitude. The following representation would be used:

| altitude | less_than | 15000.0 |
|----------|-----------|---------|

The engine will compute the following:
similarity(10000.0)=1.0
similarity(15000.0)=1.0
similarity(15001.0)=0.0

The less_than algorithm may be applied to ordered, integer, and floating point attributes.

The fuzzy_less_than algorithm is similar to the less_than algorithm. The only distinction is a gradual rather than abrupt transition from 1.0 to 0.0 in the similarity score at the threshold value.

5) greater_than, fuzzy_greater_than

The greater_than algorithm returns 1.0 if the attribute value falls on or above the specified threshold, and 0.0 if it is below the threshold. For example, consider a case involving a hydraulic seal leakage. The problem only occurs when the pressure differential across the seal is more than 4 atmospheres. The following representation would be used:

| pressure differential | greater_than | 4.0 |
|-----------------------|--------------|-----|

The engine will compute the following:
similarity(3.999)=0.0
similarity(4.0)=1.0
similarity(5.0)=1.0

The greater_than algorithm may be applied to ordered, integer, and floating point attributes. The fuzzy_greater_than algorithm is similar to the greater_than algorithm. The only distinction is a gradual rather than abrupt transition from 1.0 to 0.0 in the similarity score at the threshold value.

6) near_to

The near_to algorithm returns 1.0 if the attribute value in the problem description exactly matches the value in the stored case. The match level decreases to 0.0 as the values move apart from each other. The calculation is performed according to the following equation:

For example, consider a case involving propeller vibration due to a worn reduction gear. The vibration is most apparent when the propeller is operating at 2300 rpm. The following representation would be used:

| propeller rpm | near_to | 2300 |
|---------------|---------|------|

The engine will compute the following:
similarity(1000)=0.00
similarity(2000)=0.4
similarity(2100)=0.6
similarity(2300)=1.0
similarity(2400)=0.8
similarity(2700)=0.2

The near_to algorithm may be applied to integer and floating point attributes.

7) range

The range algorithm returns 1.0 if the attribute value falls on or within the specified limits, and 0.0 if it is outside the limits. For example, consider a case involving ice buildup on an aircraft wing. For arguments sake, assume icing only occurs between 10,000 and 15,000 feet altitude. The following representation would be used:

| altitude | range | 10000.0, 15000.0 |
|---|---|---|

The engine will compute the following:
similarity(9999.0)=0.0
similarity(10000.0)=1.0
similarity(15000.0)=1.0
similarity(15001.0)=0.0

The range algorithm may be applied to ordered, integer, and floating point attributes.

The similarity-computation schemes are classified according to the applicable attribute types. The following discussion deals with the computation of attribute similarity i.e.: the mapping from two values of a particular attribute to a number in the range 0.0 to 1.0. Throughout this discussion, the superscript "nc" on a variable refers to the variable's value in new problem case. The superscript "sc" refers to the variable's value in the solved case. The label "val" refers to value.

Figure 9:
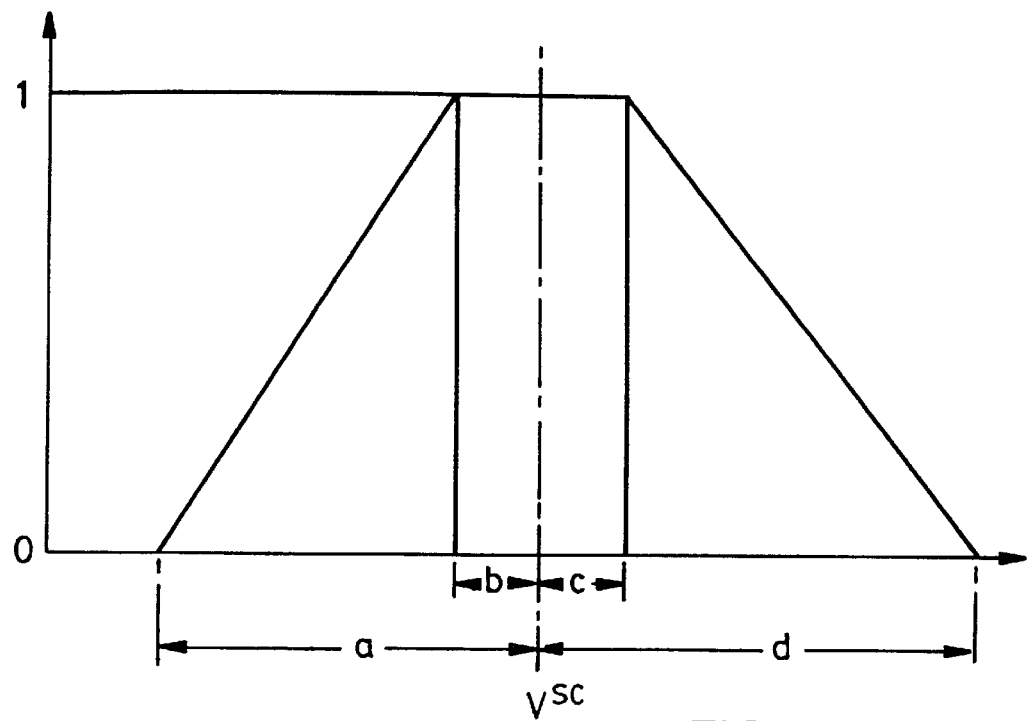
FIG. 9 is an illustration of the SIM function definition about a previously solved case using the quad-tuple representation.
Figure 10:
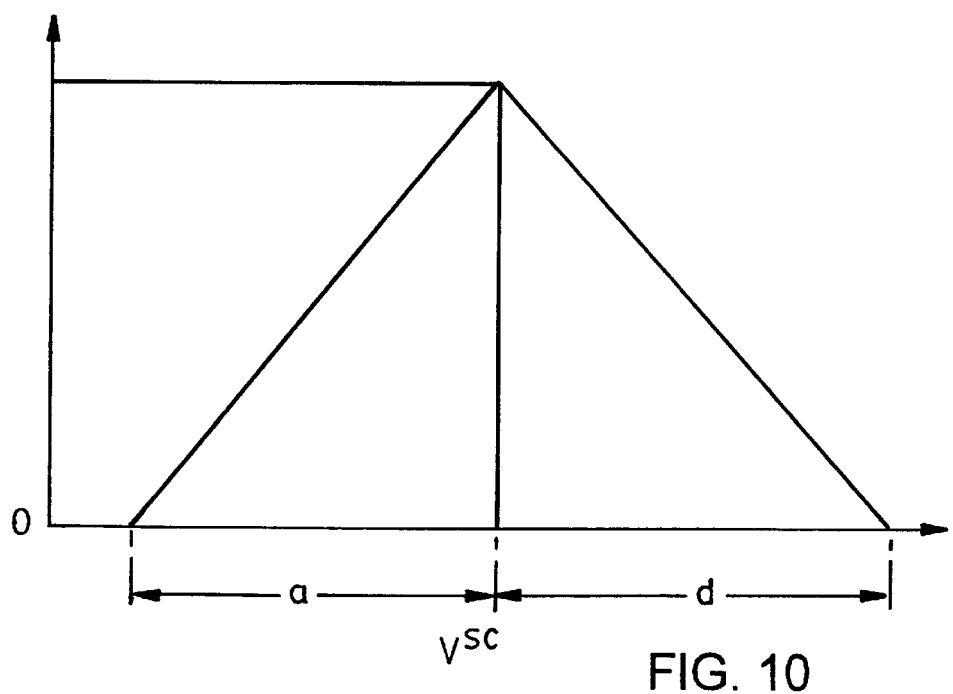
FIG. 10 is a graph of the encoding of the "near_to" matching algorithm.
Figure 11:
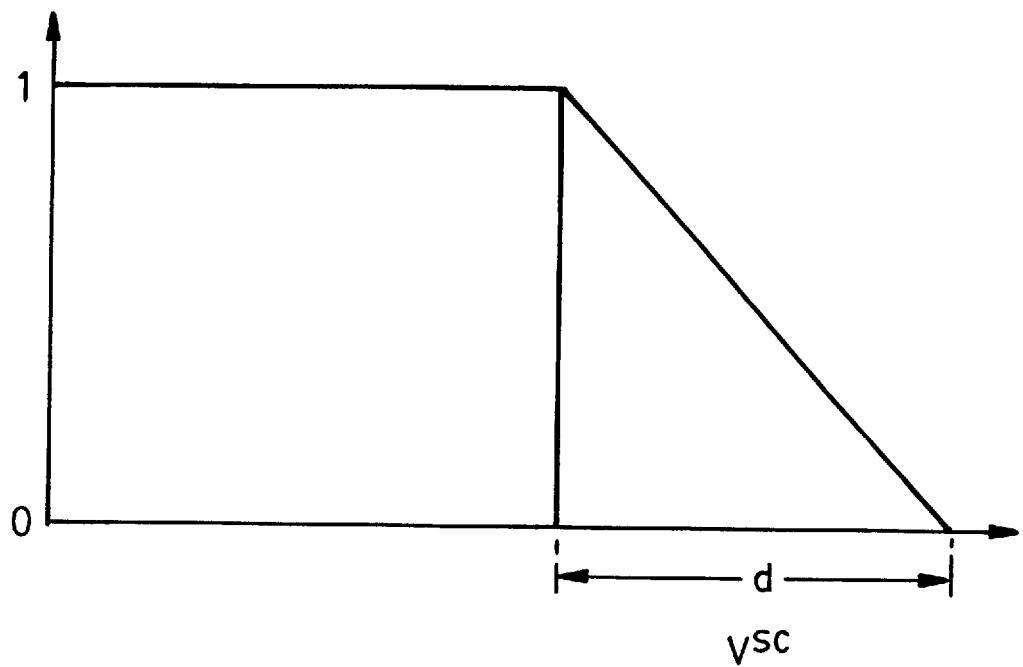
FIG. 11 is a graph of the encoding of the "fuzzy_less_than" matching algorithm.
Figure 12:
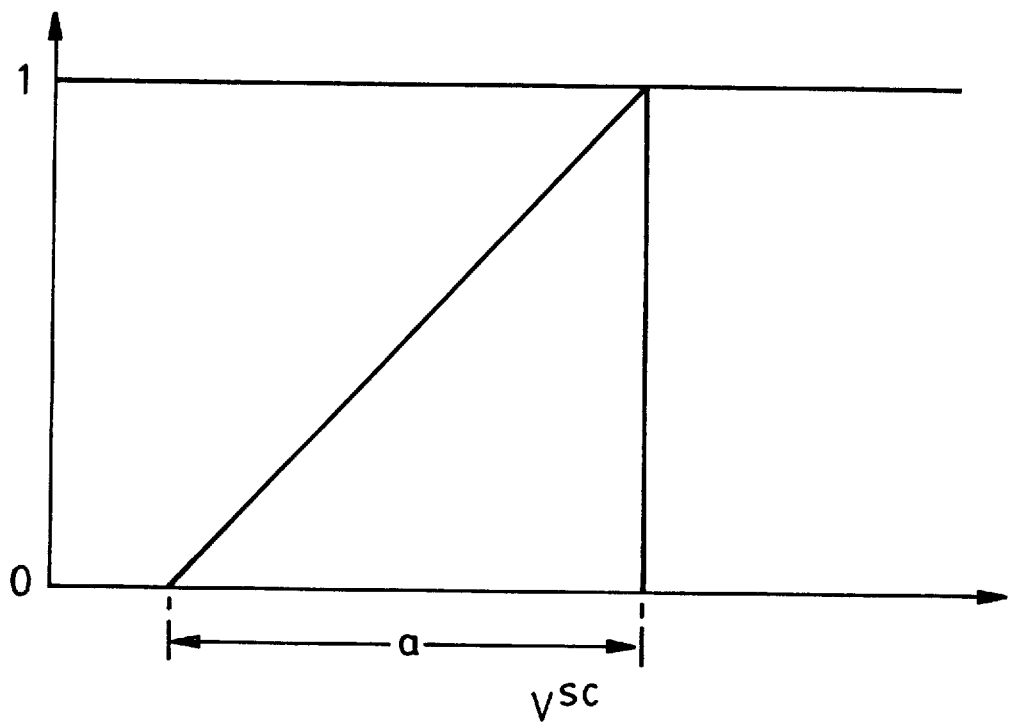
FIG. 12 is a graph of the encoding of the "fuzzy_greater_than" matching algorithm.
Figure 13:
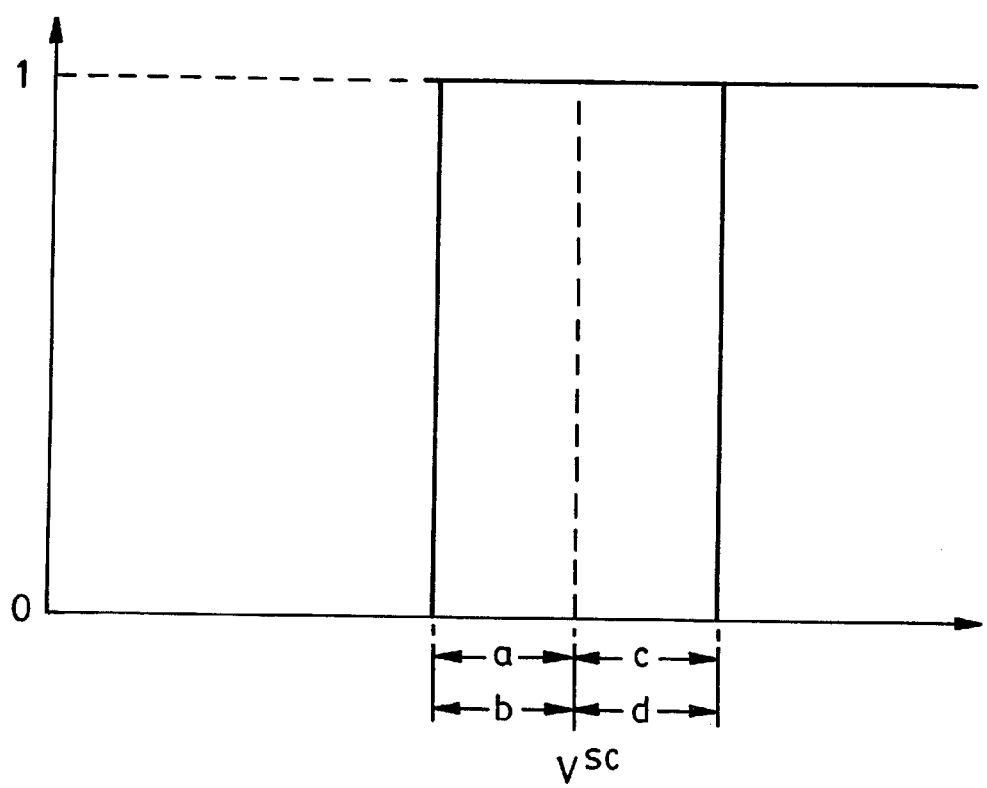
FIG. 13 is a graph of the encoding of the "range" matching algorithm.
Figure 14:
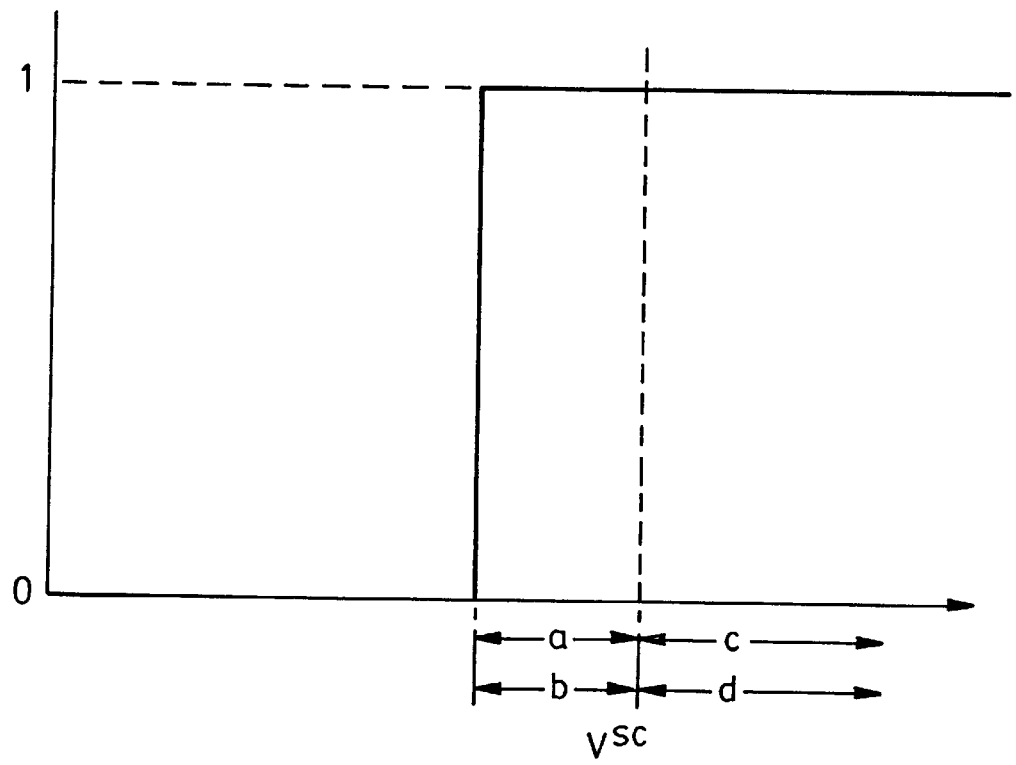
FIG. 14 is a graph of the encoding of the "greater_than" matching algorithm.
Figure 15:
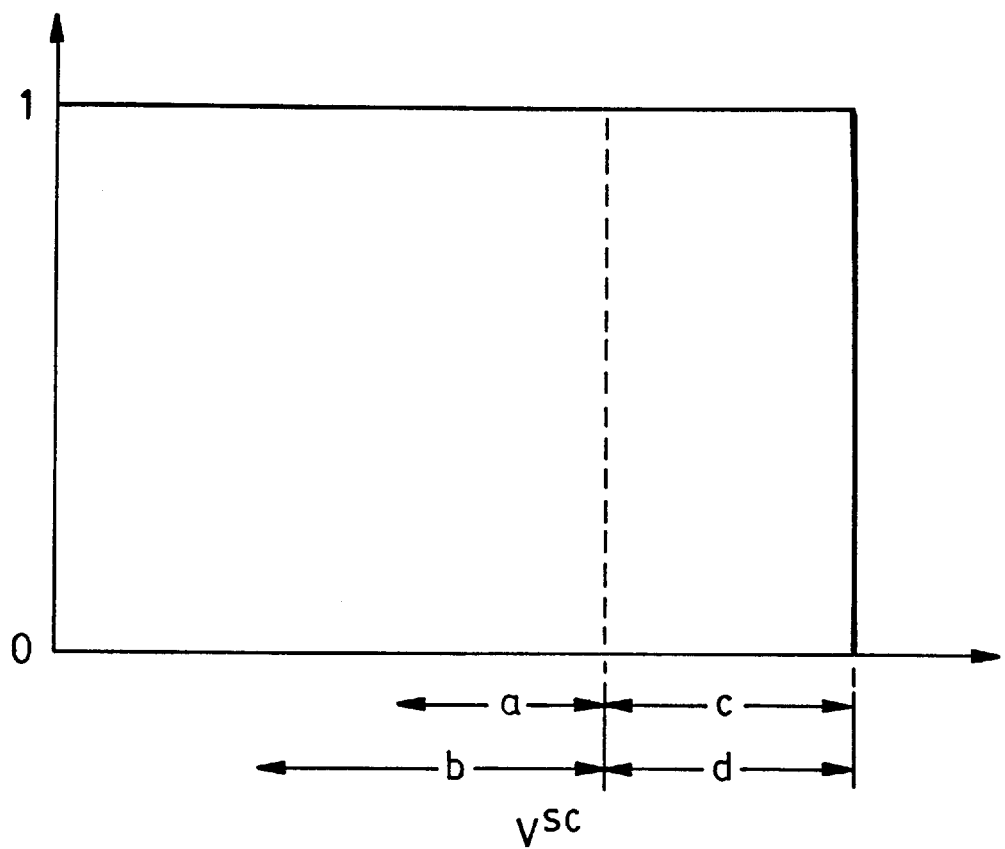
FIG. 15 is a graph of the encoding of the "less_than" matching algorithm.

FIG. 9 illustrates a similarity function definition using a quad-tuple representation, utilizing four parameters. Computation of numeric similarities is based on four parameters (hence, the name quad-tuple or set of four). These four parameters are a, b, c, and d. The parameters are defined relative to a reference value. This reference value is usually the value in the stored case. For most computations, the value of a, b, c, and d are specified in the units associated with the attribute.

Comparison schemes based on the standard deviation information for an attribute may be implemented as well. Parameters for such schemes will be defined in standard deviation units.

The interpretation of the quad-tuple parameters is as follows:

a. If the new value is lower than the reference value by this amount or more it is considered completely dissimilar. For example, consider a scenario where the temperature is lower by 15 degrees, resulting in significantly difference operating characteristics.

b. If the new value is lower than the reference value by this amount or less it is considered essentially identical. (i.e., the decision maker is not concerned by the difference). For example, consider a scenario where the temperature is lower by 5 degrees, but the difference does not affect the outcome.

c. If the new value is greater than the reference value by this amount or less it is considered essentially identical.

d. If the new value is greater than the reference value by this amount or more it is considered completely dissimilar.

These parameters define the attribute similarity function about a particular value. A number of functional forms can be derived through different parameter settings (0 and ∞). An example of each functional form and its meaning follows.

The similarity computation is detailed in Table 3.

TABLE 3

Numeric Similarity Computation Scheme

| Condition | Computation |
|---|---|
| $V^{nc} < (V^{sc} - a)$ | $sim(V^{nc}, V^{sc}) = 0$ |
| $(V^{sc} - a) \leq V^{nc} \leq (V^{sc} - b)$ | $sim(V^{nc}, V^{sc}) = (V^{nc} - V^{sc} + a)/(a - b)$ |
| $(V^{sc} - b) \leq V^{nc} \leq (V^{sc} + c)$ | $sim(V^{nc}, V^{sc}) = 1$ |
| $(V^{sc} + c) \leq V^{nc} \leq (V^{sc} + d)$ | $sim(V^{nc}, V^{sc}) = (V^{nc} - V^{sc} - c)/(d - c)$ |
| $(V^{sc} + d) \leq V^{nc}$ | $sim(V^{nc}, V^{sc}) = 0$ |

FIGS. 10 through 15 illustrate special case membership functions which can be derived by using different parameter settings. Each of these special cases correspond to a local similarity match algorithm as discussed earlier.

Special case I. b=0 and c=0. This corresponds to the near_to matching algorithm. See FIG. 10.

Special case II. a=∞, c=0, and b=∞. This corresponds to the fuzzy_less_than matching algorithm. See FIG. 11.

Special case III. b=0, c=∞, and d=∞. This corresponds to the fuzzy_greater_than matching algorithm. See FIG. 12.

Special case IV. b=a, and d=c. This corresponds to the range matching algorithm. See FIG. 13.

Special case V. b=a, and d=c=∞. This corresponds to the greater_than matching algorithm. See FIG. 14.

Special case VI. b=a=∞, and d=c. This corresponds to the less_than matching algorithm. See FIG. 15.

The case specific scheme defines/redefines the global scheme with reference to the value used in a case. Although, this lends a great deal of flexibility for reasoning and for including context specific similarity assessment, the case specific specification should be avoided.

The same local similarity scheme can be used by symbolic ordinal or even numeric integer types to override other numeric computation schemes. The case specific similarity scheme is used to implement the custom_fuzzy_match similarity algorithm.

The must match scheme enforces a match with the attribute in which it is specified. That is, if the similarity with the specified attribute value is less than a preset threshold similarity value the overall similarity of the case (OSIM) is zero. The need for such a scheme frequently arises while representing applicability information in a case. For example, a D.C. motor case does not apply to an A.C. motor case. Therefore, the attribute "motor type=D.C." is specified with a must match similarity scheme.

The must match scheme is used locally in conjunction with any of the local similarity schemes. By default, the must match scheme is not enabled. The must match scheme includes a local similarity threshold value. The local similarity threshold value is specified by a linguistic label indicating the level of similarity. The labels used must be the same as those used in the similarity matrix. Consider the following example:

| Attribute-value | Local similarity scheme | Must match scheme |
|---|---|---|

-continued

| Motor type = D.C. | {D.C., 1, A.C., 0} | Must-match-similarity-threshold = Exact |

In the example, the local similarity scheme says that the match of motor type with value D.C. is 1 and with value A.C. is 0. The must match scheme is interpreted as: the similarity of motor type must be at least exact for the case to be considered.

The overall similarity (OSIM) between a new problem case and a previously solved case is computed using the various matching functions of matcher module 36. Four exemplary matching functions are presented hereinbelow. It is assumed that no attribute weighting (i.e. domain knowledge or contextual knowledge) is provided with a new problem case description. This implies that the attributes of a new problem case are considered as equally weighted (e.g., 1). All the functions presented here are Nearest-Neighbour like because they deviate from the true nearest-neighbour function. The deviations include consideration of only a subset of all possible attributes for matching and the use of local importance of attributes. The local importance refers to the importance of an attribute in the context of a previously solved case (i.e., importance of an attribute is dependent on a previously solved case and recorded along with it).

Nearest-neighbour uses global weights (i.e. importance of an attribute is the same across the whole case base). Prior art systems typically implement the true nearest-neighbour, and as a result do not consider local weights, nor can work with a subset of attributes.

Of the functions presented here, modified cosine matching function (OSIM 4) is considered to be the most sophisticated one. It performs significantly better than the nearest-neighbour when local importance along with subset of all possible attributes are used for matching. It also has the ability to consider contextual variation (i.e., difference between the importance of attributes of new problem case and a previously solved case). While this provides the ability to match contexts, it can make the matching oversensitive. The full contrast modified nearest-neighbour (OSIM 1) is a close second choice.

| Acronym | Definition |
|---------|------------|
| CSC | Candidate Solved Case |
| NC | New Problem Case |
| RA | Recommended Attributes |

TABLE 4

OSIM

| | | |
|---|---|---|
| 1. Nearest-Neighbour (Full contrast weighted version) | $OSIM = \dfrac{\sum_i w_i \text{sim}()}{\sum_i w}$ | The function operates over all relevant-attributes. The weights w of relevant attributes are assigned according to the CSC. For those attributes not in CSC they are equally weighted using a defined scheme. |
| 2. Nearest-Neighbour (Partial contrast-CSC view weighted version) | $OSIM = \dfrac{\sum_i w_i \text{sim}()}{\sum_i w}$ | The function operates over CSC attributes only. |
| 3. Nearest-Neighbour (Partial contrast-NC view weighted version) | $OSIM = \dfrac{\sum_i w_i \text{sim}()}{\sum_i w}$ | The function operates over NC attributes only. |
| 4. Modified Cosine Function | $OSIM = \dfrac{\sum_i w_i^{NC} w_i^{CSC} \text{sim}()}{\sqrt{\sum_i (w_i^{NC})^2 \sum_i (w i^{CSC})^2}}$ | This function operates over all relevant attributes, is capable of complete contrast and can take into account weights from NC and CSC |

TABLE 5

OSIM computing example

| Attributes | $A_1$ | $A_2$ | $A_3$ | $A_4$ | $A_5$ | $A_6$ | OSIM (1) | OSIM (2) | OSIM (3) | OSIM (4) |
|---|---|---|---|---|---|---|---|---|---|---|
| NC | ✓ | | ✓ | ✓ | | ✓ | | | | |
| CSC | | ✓ | ✓ | ✓ | ✓ | | | | | |

TABLE 5-continued

OSIM computing example

| Attributes | $A_1$ | $A_2$ | $A_3$ | $A_4$ | $A_5$ | $A_6$ | OSIM (1) | OSIM (2) | OSIM (3) | OSIM (4) |
|---|---|---|---|---|---|---|---|---|---|---|
| sim() | 0 | 0 | 1 | 1 | 0 | 0 | | | | |
| $W^{NC}$ | 1 | 0 | 1 | 1 | 0 | 1 | | | | |
| $W^{CSC}$ | 0 | 1 | 1.25 | 1.75 | 1.5 | 0 | 0.4000 | 0.5454 | 0.5000 | 0.5345 |
| $W^{RA}$ | 1 | 1 | 1.25 | 1.75 | 1.5 | 1 | | | | |

As will be apparent to those skilled in the art, various modifications and adaptations of the method and system described above are possible without departing from the present invention, the scope of which is defined in the appended claims.

We claim:

1. A method for assisting a user in solving a new problem case within a selected domain, comprising the steps of:
    (a) providing a database comprising global domain knowledge relating to components of the selected domain, local domain knowledge, and a plurality of previously solved cases in the selected domain, each of the previously solved cases including a plurality of case attributes, said case attributes comprising case attribute names and known values associated therewith, said local domain knowledge comprising associations between the case attributes of a previously solved case;
    (b) prompting the user to select a component of the domain and to select from the case attributes a set of attributes considered to be relevant to the new problem case and to provide current values for each of the new problem case attributes;
    (c) searching the database of previously solved cases for candidate solved cases that include one or more of the new problem case attributes selected by the user and generating a list of said candidate solved cases;
    (d) matching the candidate solved cases to the new problem case by comparing the current value for each of the new problem case attributes to the known value for the same case attribute in each of the candidate solved cases;
    (e) ranking the candidate solved cases in order of relevance based upon the matching and presenting a list of ranked candidate solved cases in order of relevance based upon the ranking;
    (f) generating additional questions based upon unanswered attributes of the candidate solved cases, the unanswered attributes being those case attributes for which values have not yet been provided by the user, and based upon the local domain knowledge, thereby assisting the user to select and provide values for the unanswered attributes; and
    (g) repeating steps (b) through (f) inclusive until the user is satisfied with the list of candidate solved cases.

2. The method defined in claim 1, wherein the local domain knowledge comprises importance factors for the case attributes within a previously solved case, the importance factors being utilized in determining of which attributes questions should be first asked.

3. The method as claimed in claim 2 wherein the matching step comprises the steps of:
    (a) creating the list of candidate solved cases by reading each solved case and adding it to the list of solved candidate cases if any of the case attributes associated therewith match any of the new problem case attributes selected by the user for the new problem;
    (b) generating an attribute similarity value for each case attribute of each solved case in the list of candidate solved cases; and
    (c) generating an overall similarity value for each case in the list of candidate solved cases based upon the sum of the attribute similarity values.

4. The method defined in claim 3, wherein the step of generating additional questions is based upon:
    a) the overall similarity of the new problem case to the candidate solved case;
    b) the importance of the unanswered attribute in the candidate solved case and;
    c) a vote value for the unanswered attribute in the new problem case created by summing the attribute importance by the overall similarity for each candidate solved case containing the unanswered attribute.

5. The method defined in claim 1, wherein the local domain knowledge comprises precedent constraints linking case attributes, within a previously solved case, the precedent constraints enabling questions related to the unanswered attributes to be generated only if the precedent constraints are satisfied.

6. The method defined in claim 5 wherein the step of generating additional questions comprises asking questions related to the unanswered case attributes in descending order of overall similarity, attribute importance factor and vote value.

7. The method defined in claim 5, wherein the precedent constraints are satisfied when the user has provided values for the case attributes linked to the unanswered attribute, and the values exceed a predetermined threshold similarity value.

8. The method defined in claim 1, wherein the local domain knowledge comprises match operators which enable values for case attributes relating to the new problem case to be matched with the known values for case attributes of previously solved cases.

9. The method defined in claim 1, wherein the step of generating additional questions comprises the steps of:
    (a) reading a candidate solved case from the list of ranked candidate solved cases;
    (b) creating a list of case attributes from the candidate solved case, that have had all precedence requirements met before a question can be asked of the user;
    (c) updating an initially empty list of unanswered case attributes having no value supplied by the user comprising the steps of:
        (i) reading the list of case attributes created by step (b);
        (ii) adding the case attribute to the list of attributes if it does not yet exist on the list;
        (iii) increasing the vote value of the attribute identifier if it exists on the list;

(iv) repeating steps (i) to (iii) for each attribute;

(d) repeating steps (a) to (c) for each case in the list of candidate solved cases;

(e) generating a sorted list from the list created by step (d); and (f) asking the user questions in order of the attributes in the sorted list created by step (e).

10. The method defined in claim 1, wherein the database is a relational database.

11. The method defined in claim 10, wherein the database includes tables which define the hierarchical relationships between components of a piece of complex apparatus.

12. The method defined in claim 1, wherein the case attributes comprise numeric attributes and symbolic attributes.

13. The method defined in claim 12, wherein the matching step includes converting the values of the symbolic attributes into numbers using a look-up table.

14. The method defined in claim 1, wherein the symbolic attributes comprise symbolic nominal attributes, and symbolic ordinal attributes.

15. A computer system for assisting a user in solving a new problem case relating to a domain, comprising;

(a) storage means for storing a database comprising a plurality of solved cases, each of said solved cases comprising a plurality of case attributes, said case attributes comprising case attribute names and known values associated therewith, and local domain knowledge for the selected domain, the local domain knowledge comprising associations between the case attributes of a previously solved case;

(b) interface means for interfacing with the user, comprising output means for outputting to the user a list of case attributes of the solved cases and input means for enabling the user to select from the list of case attributes a set of attributes considered to be relevant to the new problem case, and to input current values for case attributes relating to a new problem case; and (c) processing means coupled to the storage means and the interface means for processing the current values of the new problem case attributes, comprising:

(i) searching means for searching the database of previously solved cases for candidate solved cases;

(ii) matching means for matching the candidate solved cases to the new problem case by comparing the current values of the new problem case attributes with known values for the same case attributes for each of the candidate solved cases and determining the overall similarity of a new problem case with each candidate solved case; and (iii) ranking means for ranking the candidate solved cases in order of relevance based upon the matching and creating a list of ranked candidate solved cases based upon said ranking.

16. The system defined in claim 15, wherein the processing means also comprises question generation means for generating additional questions based upon unanswered attributes in the candidate solved cases, the unanswered attributes being those case attributes for which values have not yet been provided by the user, to assist the user to enter additional current values for case attributes.

17. The system defined in claim 16, wherein the question generating means comprises:

a) means for determining the overall similarity of the new problem case to the candidate solved case;

b) means for determining the importance of the unanswered attribute in the candidate solved case; and c) means for determining a vote value for the unanswered attribute in the new problem case created by summing the attribute importance by the overall similarity for each candidate solved case containing the unanswered attribute.

18. The system defined in claim 16, wherein the question generating means comprises means for selecting questions based upon the unanswered case attributes in descending order of overall similarity, attribute importance and vote value.

19. The system defined in claim 15, wherein the local domain knowledge comprises importance factors for the case attributes within a previously solved case, the importance factors being utilized in the determination of which attributes questions should first be asked.

20. The system defined in claim 15, wherein the local domain knowledge comprises precedent constraints linking case attributes, within a previously solved case, the precedent constraints enabling questions related to the unanswered attributes to be generated only if the precedent constraints are satisfied.

21. The system defined in claim 15, wherein the local domain knowledge comprises match operators which enable values for case attributes relating to the new problem case to be matched with the known values for case attributes of previously solved cases.

22. The system defined in claim 15, wherein the matching means comprises means for determining a similarity value for a given attribute of a given solution candidate case ranging from completely dissimilar to essentially identical based upon four parameters.

23. A method for assisting a user in solving a new problem case within a selected domain, comprising the steps of:

(a) providing a database comprising global domain knowledge relating to components of the selected domain, local domain knowledge, and a plurality of previously solved cases in the selected domain, each of the previously solved cases including a plurality of case attributes, said case attributes comprising case attribute names and known values associated therewith, said local domain knowledge comprising associations between the case attributes of a previously solved case;

(b) prompting the user to select a component of the domain and to select from the case attributes a set of attributes considered to be relevant to the new problem case and to provide current values for each of the new problem case attributes;

(c) searching the database of previously solved cases for candidate solved cases that include one or more of the new problem case attributes selected by the user and generating a list of said candidate solved cases; and (d) matching the candidate solved cases to the new problem case by comparing the current value for each of the new problem case attributes to the known value for the same case attribute in each of the candidate solved cases, wherein the matching step comprises generating an attribute similarity value ranging from completely dissimilar to essentially identical based upon four parameters, the parameters each defining a threshold of similarity or dissimilarity either less than or greater than a reference value.

24. The method defined in claim 23, wherein the similarity value is determined to be completely dissimilar if the value of the attribute in the new problem case is lower than the value of the corresponding attribute in the solved case by the first parameter or more.

25. The method defined in claim 23, wherein the similarity value is determined to be essentially identical if the value of attribute in the new problem case is lower than the value of the corresponding attribute in the solved case by the second parameter or less.

26. The method defined in claim 23, wherein the similarity value is determined to be essentially identical if the value of attribute in the new problem case is greater than the value of the corresponding attribute in the solved case by the third parameter or less.

27. The method defined in claim 23, wherein the similarity value is determined to be completely dissimilar if the value of attribute in the new problem case is greater than the value of the corresponding attribute in the solved case by the fourth parameter or more.

28. The method defined in claim 23, wherein the step of generating the attribute similarity value comprises the step of mapping the values of an attribute in the solved case and the corresponding attribute in the new problem case into a number in the range from 0.0 to 1.0.

29. The method defined in claim 23, wherein the matching steps also comprises the step of generating an overall similarity value for each of the candidate solved cases based upon the sum of the attribute similarity values.

30. The method defined in claim 29, wherein the step of generating an overall case similarity value comprises the steps of:
   a) for each attribute in common between the previously solved case and the new problem case; summing the product of: the importance factor of the attribute in the new problem case, the importance factor of the attribute in the previously solved case, and the attribute similarity value;
   b) summing the squares of the importance factor of each attribute in the new problem case;
   c) summing the squares of the importance factor of each attribute in the previously solved case;
   d) taking the square root of the results of steps b) and c); and
   e) dividing the results of step a) by the results of step d).

* * * * *